June 5, 1951 — J. NAULT — 2,555,597
HOMOGENIZATION APPARATUS
Filed Nov. 20, 1948
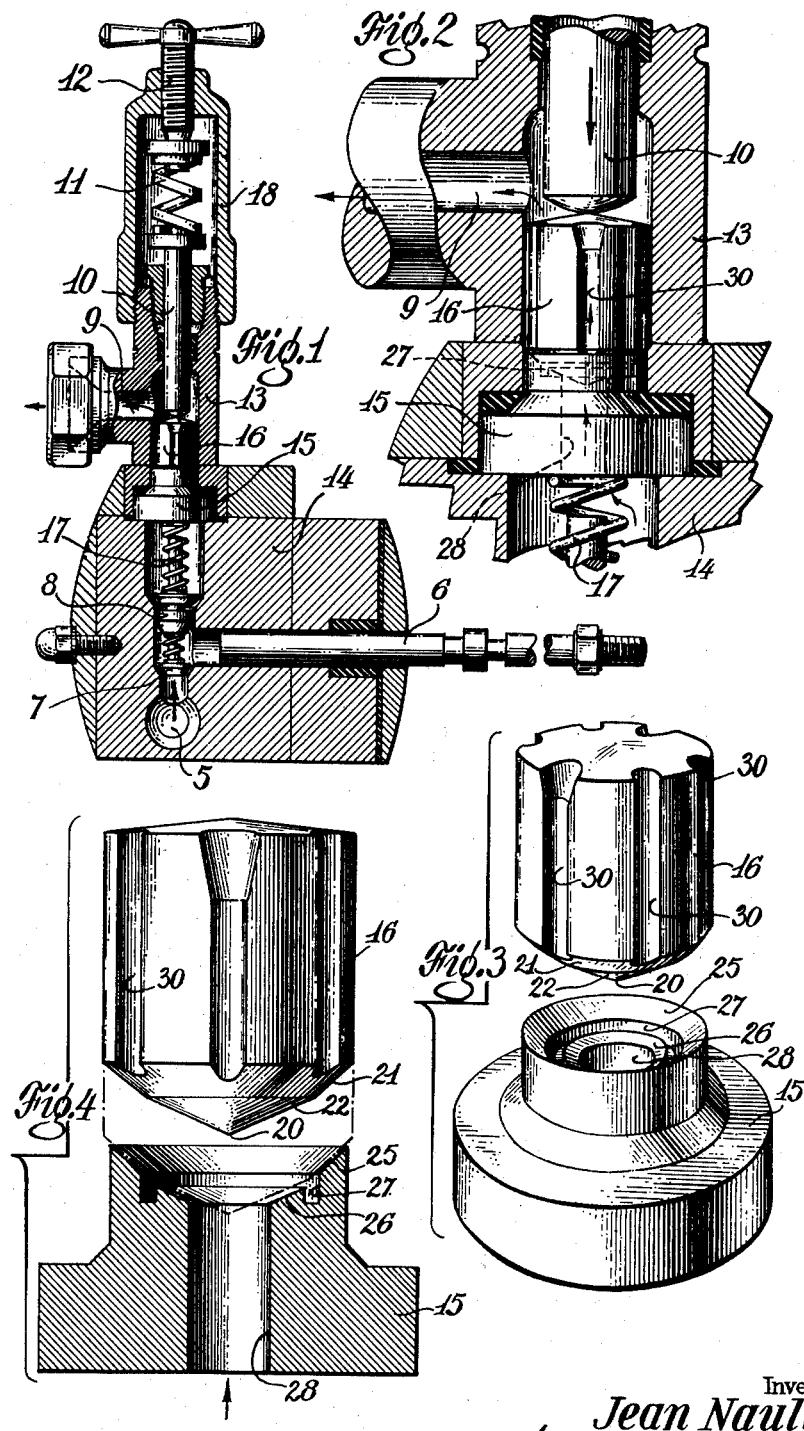
Inventor
Jean Nault
By Robic & Bastien
Attorneys Patented June 5, 1951

2,555,597

UNITED STATES PATENT OFFICE 2,555,597

HOMOGENIZATION APPARATUS

Jean Nault, Montreal, Quebec, Canada, assignor to B. Trudel & Cie Ltee., Montreal, Quebec, Canada Application November 29, 1948, Serial No. 61,222

4 Claims. (Cl. 138—43)

The present invention relates to homogenization apparatus.

More specifically, this invention relates to apparatus designed for the homogenization of milk wherein the particles suspended in the milk are subjected to a heavy squeezing or pressure.

The homogenization of milk is a well-known process wherein whole milk is passed through a special apparatus, or valve, under tremendous pressure, whereby the carbohydrate cells are broken down and a perfect emulsion obtained. Practice has shown, however, that the initial passage of milk in the valve results in an emulsion of viscosity, or density, much too high for the purpose of producing a milk suitable for normal table use or cooking.

For reasons which are not well explained, however, it has been found that a second passage of the initially emulsified milk through the pressure valve, under identical operating condition, achieves the required purpose of a perfectly homogenized product having a viscosity approaching that of unprocessed milk and suitable for a wide variety of culinary and alimentary requirements.

Thus, so far, the homogenization of milk has been performed in two separate stages requiring, for continuous operation, duplicate devices which are costly, cumbersome and of expensive upkeep and operation. This will be readily realized when it is considered that the operating pressure, being in the thousands of pounds per square inch, necessitate special piping, pumps, precautions and heavily constructed devices.

The present invention has been conceived to avoid the disadvantages noted above, that is: it contemplates an apparatus wherein a single valve is so designed as to homogenize the milk processed in two separate stages, in accordance with accepted practice. The objects of the invention may then be stated as follows:

The main object of the present invention is to provide an improved homogenization apparatus wherein all the stages necessary to proper treatment of the milk are provided in a single unit.

Obviously, another important object of the invention is to provide homogenization apparatus which is smaller, simpler, and more economical than those presently in use.

Another important object is to provide apparatus of the type set forth which is relatively easily constructed, and applicable to a single unit of such apparatus of the conventional type with only minor alterations.

Still another object resides in the provision of apparatus of the character described which is efficient in operation and may be quite easily controlled.

Other objects and advantages will become apparent, or be further pointed out, in the description to follow.

As an example, and for purposes of illustration only, a preferred embodiment of my invention is shown in the annexed drawing, wherein:

Fig. 1 shows a sectional elevation through a more or less conventional unit of an homogenization apparatus, which has been modified or reconstructed according to the principles of the invention;

Fig. 2 shows an enlarged sectional elevation corresponding to that portion of the apparatus in Fig. 1 which includes the improved pressure valve of this invention;

Fig. 3 shows a perspective view of the pair of cooperative members in the pressure valve of Fig. 2 which constitute the fundamental feature of the invention, and Fig. 4 shows an elevation view of the two parts of Fig. 3, partly in section, illustrating the cooperation thereof.

Referring now to the drawing, wherein the same reference characters denote corresponding parts throughout, it may again be emphasized that homogenization apparatus of this type acts upon the principle that the particles in suspension in the milk must be subjected to heavy pressures or to squeezing, then allowed to expand somewhat, and then again subjected to pressure (preferably this time of a somewhat higher order) in order that the resultant milk product will have the fatty particles distributed virtually homogeneously therethrough and of proper viscosity.

In Fig. 1, then, the milk to be processed will enter the apparatus from any reservoir through the pipe or duct 5. The reciprocating piston 6 alternately draws the milk past check valve 7 on its expansion stroke, and urges the milk up into the apparatus, through check valve 8, on its compression stroke. In a conventional unit of the type currently employed, the milk driven past valve 8 under pressure might be forced between a pair of blocks separated by only a minute distance, such an operation leading to the squeezing of the fatty particles in the milk under high pressure, and then allowed to pass from the unit through outlet 9 and into the next unit providing the second stage of the process. The pressure on the block between which the milk was forced would be provided by the pressure with which the milk was driven upwards by piston 6 on the one hand, and the downward pressure exerted by a slidable post 10 urged by a strong spring 11 under the control of an adjustable bolt 12. The post 10 would be slidable in casing 13 of the apparatus on which the cap 18 (holding bolt 12 and spring 11) might be releasably secured. The casing 13, which includes outlet 9, might be mounted on the block 14 in which piston 6 reciprocates and in which enters duct 5.

In the present instance, a pair of co-operatively associated blocks underneath post 10 are designed in such a manner as to carry out both the pressure states required to properly homogenize the milk with a quiescent or non-pressure stage in between. These members comprise the lower block 15 and the upper block 16, the former of which is pillowed on the top of block 14 immediately above check valve 8, and the latter of which is located between post 10 and block 15.

Between check valve 8 and the base of block 15 is located a spring 17 which, when check valve 8 is urged upwardly by the compression stroke of piston 6, will increase the pressure on the base of block 15 and tend to urge the latter upwardly against the upper block 16, the latter, in turn, being held down by the adjustable pressure applied on post 10.

The lower end of block 16 is bevelled downwardly and inwardly towards the center 20 thereof, the said bevelled portion comprising two distinctly separate slopes 21 and 22. The former of these commences at the outer edge of the block and extends peripherally inward for a distance somewhat less than halfway to center 20. Slope 22 is somewhat less steep than slope 21 (that is, is more nearly horizontal), and extends to the center 20 of the block from the inner edge of slope 21.

The upper portion of block 15 is somewhat cup shaped to receive the lower end of block 16, and has interior bevelled surfaces 25 and 26 corresponding to the slopes 21 and 22, respectively. That is, bevelled surface 25 is at the same angle relative to the horizontal as is slope 21, and bevel surface 26 similarly corresponds to slope 22. In between the bevelled surfaces 25 and 26 an annular recess 27 is provided in the top of block 15, whilst an axial bore 28 extends through block 15 from the interior of the bevel surface 26 thereof down to the base, the said bore or duct 28 providing for the introduction of unprocessed milk between the blocks 15 and 16.

Considering now that the two blocks 15 and 16 are very close together, perhaps almost touching, it will be obvious that any space existing between the blocks at the corresponding surfaces 21 and 25 will be less than the space simultaneously existing between the surfaces 22 and 26 owing to the fact that the latter surfaces are more nearly inclined to the horizontal. That is, if the blocks become separated by a short distance vertically, particles in suspension in milk passing between the blocks from the center to the peripheries thereof will be squeezed less upon passing between the surfaces 22 and 26 than will be the case upon passing between the surfaces 21 and 25. From this consideration, the operation of the improved homogenization apparatus should now be obvious.

As the piston 6 enters upon its compression stroke, milk urged upwardly thereby enters the axial bore 28 of block 15 under substantial pressure. The extent to which blocks 15 and 16 are urged apart by the milk seeking to pass therebetween will be limited by the pressure of post 10 downward upon block 16. However, blocks 15 and 16 are urged apart by a small vertical distance and accordingly the fatty particles of the milk are squeezed upon passing between surfaces 22 and 26 of the co-operative blocks. As this operation is completed, the particles issuing from between the said two surfaces enter into the recess 27 formed in block 15 and are accordingly allowed to expand somewhat, thus placing them in readiness, according to the process, for entering upon their second stage of squeezing or compression. This is carried out as the milk, coming behind, urges the particles again onward between the blocks, this time between surfaces 21 and 25.

The smaller distance between these two surfaces ensures that the particles will receive a more thorough squeezing or compression prior to their escape from the apparatus. As this second stage of compression is completed, the milk finds its way to one or other of the upright exterior grooves 30 on block 16 and is hence allowed to flow upwardly along the exterior of the block. From the top of block 16, the milk passes out of the apparatus through outlet 9.

To recapitulate, the present apparatus seeks to carry out in a single unit that which normally requires a pair of interconnected units with resultant increased expense and duplication of parts. The pressure valve embodying the pair of blocks 15 and 16 in the present invention operates in such a manner as to subject the milk passing therethrough to two different stages of particle compression and an intermediary stage of expansion. The actual pressure to which the milk is subjected in each of the stages, or in other words the distance by which blocks 15 and 16 are separated, is controlled by the pressure exerted through bolt 12 and spring 11 upon the top of post 10, thus rendering it possible to control the process until the greatest satisfaction is obtained.

Such an apparatus is obviously simpler, and more easily operated than conventional apparatuses, and yet at the same time the said conventional apparatuses may be modified somewhat easily into the form described above, simply by the inclusion of the pressure valve according to the invention.

The relative pressure exerted upon the milk particles in the two stages of compression is determined, with such a pair of blocks, by the relative inclination of the pairs of sloping surfaces. That is, if the inclination of slope 22 relative to slope 21 differs greatly, so will the distance between the blocks differ considerably between the two stages. Thus, depending upon the relative inclination of the surfaces on the blocks, the relative pressure exerted upon the fatty particles of the milk in the two stages may be varied according to the type of milk being processed, the desired viscosity of the final product, and other considerations.

Obviously, although the homogenization of milk has been described, it is clear that other liquids of similar characteristics may be emulsified as well in the apparatus presently disclosed and that the invention is not necessarily limited to milk processing.

It will be understood that I do not limit my invention to the particular embodiment herein shown and described, since obviously various alterations might be made in the size, shape and

Having thus described my invention, I claim:

1. In fluid-treating apparatus of the character described, a pair of co-operatively-associated blocks having two pairs of co-operative contacting bevelled surfaces, each of said pairs of surfaces defining a restricted passage between which the fluid to be treated is forced, an expansion chamber for the fluid defined between the pairs of co-operating contacting surfaces, one of said blocks having a duct therethrough whereby the fluid has access between one of said pairs of surfaces and the other block formed to permit access of fluid therearound from between the other of said pair of co-operative surfaces, said blocks enclosed in an elongated casing, adjustable means for exerting pressure on one block to urge same against the other block, means for holding the said other block against retreat from the first, and the first pair of surfaces between which the fluid passes defining a larger passage than the second pair.

2. In fluid-treating apparatus as claimed in claim 1, reciprocating piston means for urging fluid under pressure into said casing near one end thereof, and the casing having near the other end thereof an outlet for the fluid which has passed between the blocks.

3. In milk homogenization apparatus of the character described, a cylindrically bored casing, a pair of blocks disposed in slidable end-to-end arrangement in the bore adjustable resilient means for exerting a pressure urging said blocks against each other, the adjacent ends of said blocks shaped with two pairs of co-operative contacting bevelled surfaces, each of said pairs of surfaces defining a passage through which milk is to be forced, one of said blocks recessed to provide an expansion chamber between the two passages, one of said blocks having a duct therethrough whereby milk is introduced between the co-operative ends of the blocks, the casing having an inlet for the introduction of milk under pressure and an outlet for milk which has passed between said blocks.

4. In apparatus as claimed in claim 3, said pairs of bevelled surfaces formed each at an angle relative to the other whereby one of the passages so formed will be less-restricted than the other for any amount of separation of the co-operative ends of the blocks, and the pairs of surfaces arranged so that the milk undergoing treatment is first introduced between the pair of surfaces defining the less-restricted passage.

JEAN NAULT.

REFERENCES CITED

The following references are of record in the file of this patent:

UNITED STATES PATENTS

| Number | Name | Date |
| --- | --- | --- |
| 2,057,925 | Smith et al. | Oct. 20, 1936 |